Dec. 30, 1969     P. L. BREON ET AL     3,486,576

STEERING SYSTEM FOR MULTIPLE AXLE VEHICLE

Filed Jan. 18, 1968     3 Sheets-Sheet 1

INVENTORS
PEARL L. BREON
RALPH H. KRESS
JACKSON C. MEDLEY
ELVIN L. EILERS
JAMES M. KOSTAS

BY

ATTORNEYS

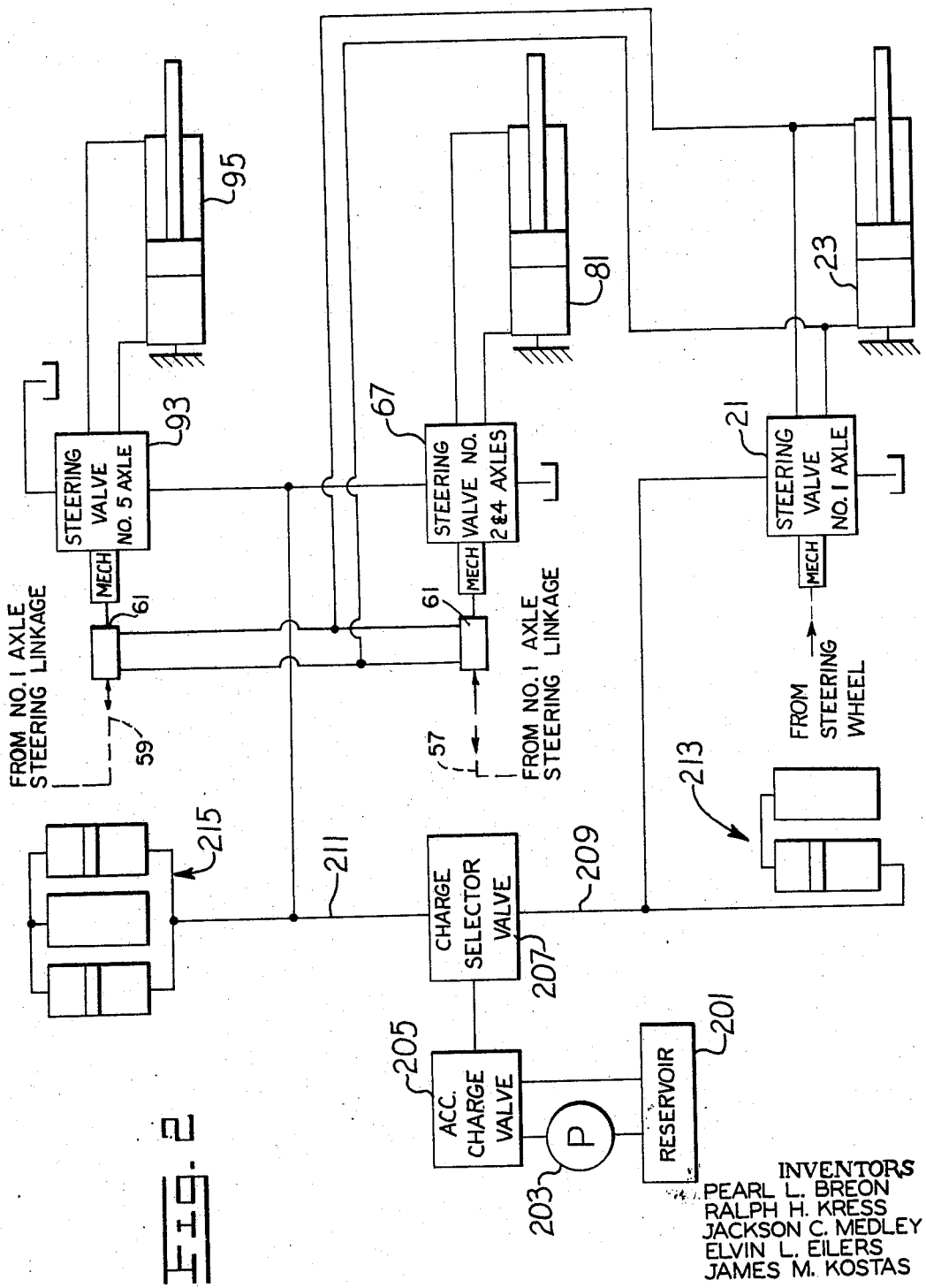

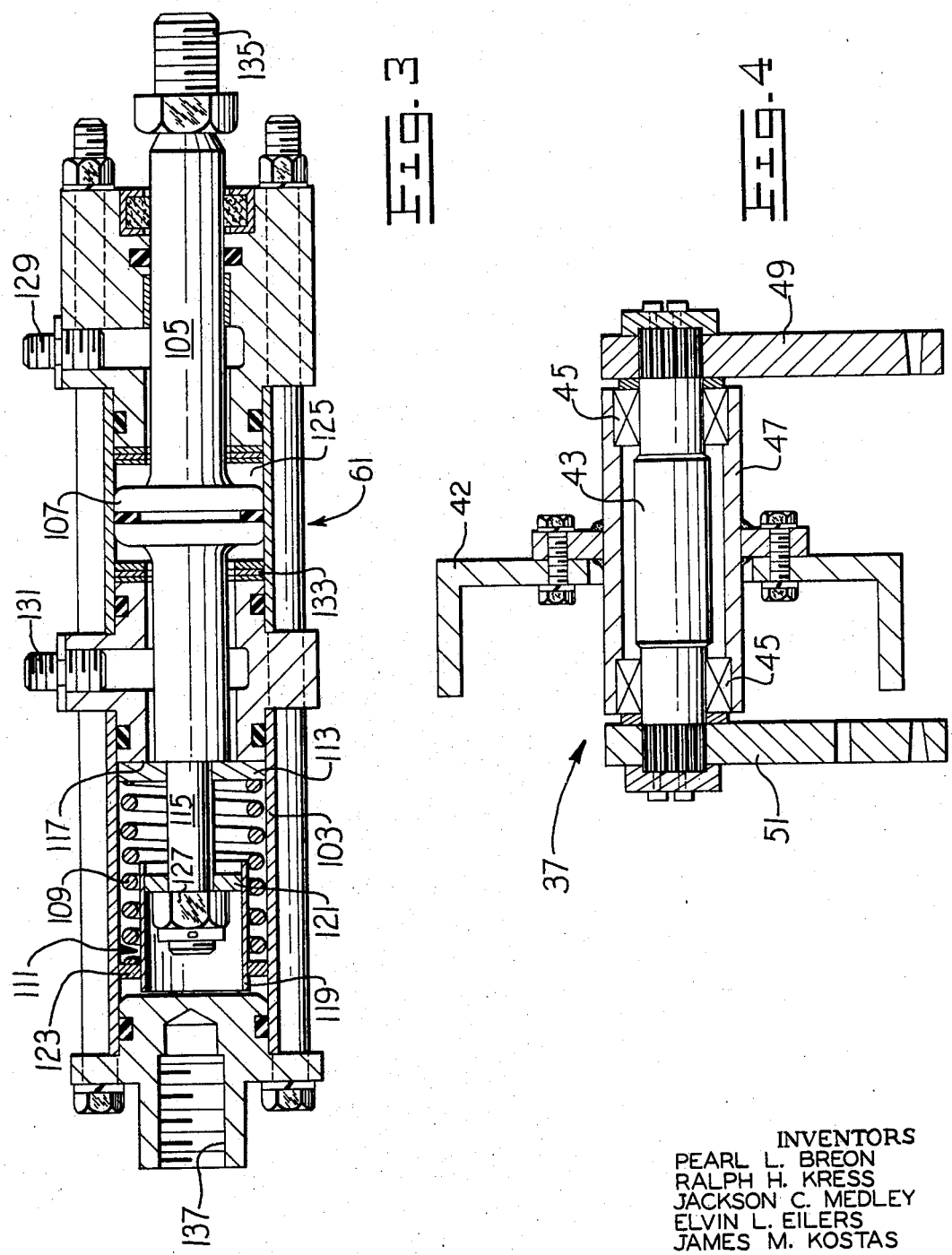

United States Patent Office 3,486,576
Patented Dec. 30, 1969

3,486,576
STEERING SYSTEM FOR MULTIPLE AXLE
VEHICLE
Pearl L. Breon and Ralph H. Kress, Peoria, and Jackson C. Medley, East Peoria, Elvin L. Eilers, Washington, and James M. Kostas, Peoria, Ill., assignors to Caterpillar Tractor Co., Peoria, Ill., a corporation of California
Filed Jan. 18, 1968, Ser. No. 698,858
Int. Cl. B62d 5/00; F16h 41/00
U.S. Cl. 180—79.2         11 Claims

ABSTRACT OF THE DISCLOSURE

A system for steering a plurality of axles of a multiple axle vehicle including a plurality of hydro-mechanical steering jack systems interconnected by a mechanical linkage which has an anticipator cylinder therein for taking up slack in the linkage, regardless of the direction in which the vehicle is to be steered, which slack may exist due to the mechanical connection of the linkages or due to the "dead band" of the hydraulic valves of the system.

---

Figure 1:
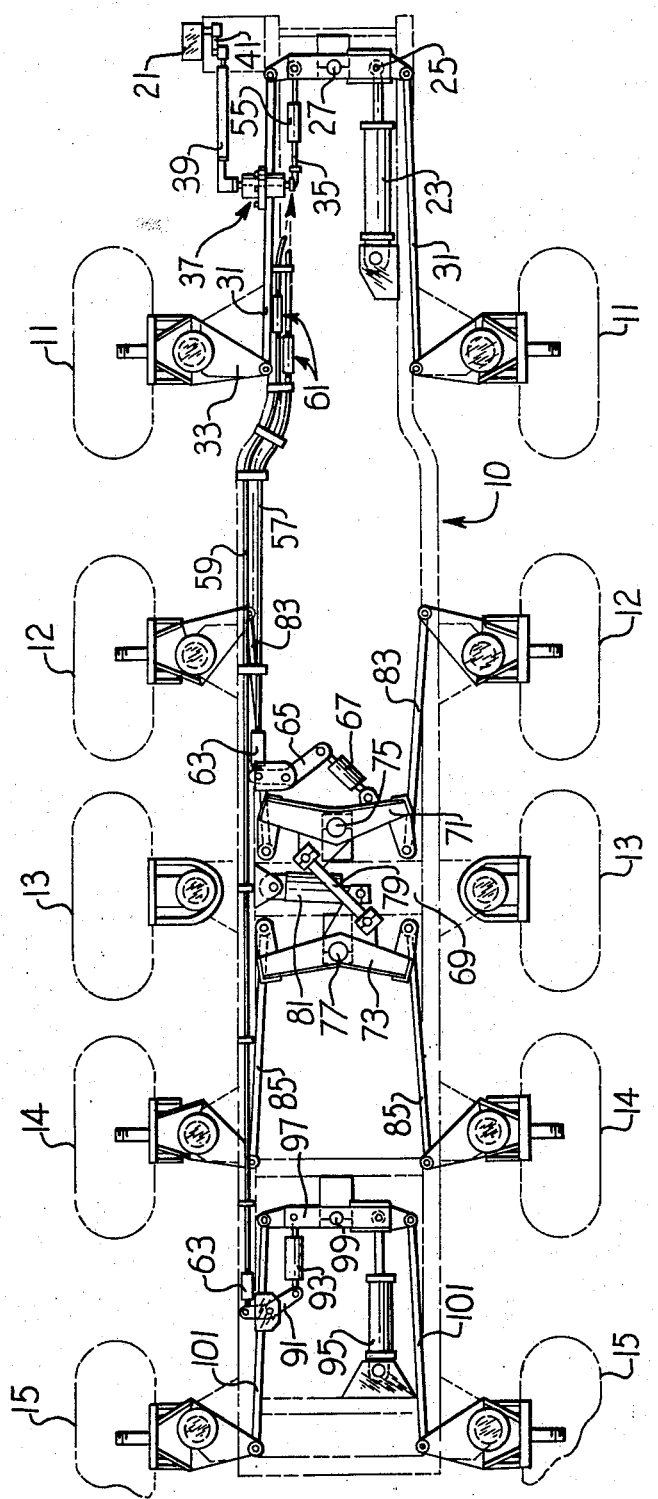

The use of the hydro-mechanical systems for steering large vehicles having a plurality of axles is well known as evidenced by a great number of patents, of which the assignee's U.S. Patent 3,323,610 to Kress et al. is a prime example.

The present invention provides such a steering system which is capable of simultaneously and accurately effecting steering motion of the wheels associated with more than two axles in a multiple axle vehicle to an extent not heretofore known. Further the system functions to permit vertical oscillation of a single wheel of the vehicle without causing the steering geometry of the dirigible wheels to produce undue tire wear. This problem is particularly significant in configurations where three or four axles are to be coordinated for simultaneous steering.

The system embodied in the present invention is highly flexible in that it can be modified for use in any vehicle wherein one set of wheels on an axle are non-dirigible and all other wheels on the vehicle are used to steer the vehicle.

In the hydraulic control circuitry provided in the structure of the present application, different fluid sources are provided for different steering mechanisms so that hydraulic failures in the one part of a vehicle hydraulic system will not result in simultaneous malfunction of the steering means of all the wheels.

As illustrated and described here, the invention may be utilized in a three, four, or five axle vehicle wherein the primary driving power of the vehicle may be provided at one axle and the other axles are used to steer the vehicle. If additional axles are desired in a single frame vehicle, the principles embodied herein may be utilized in extending the steering control to such additional axles.

It is therefore an object of this invention to provide an improved multiple axle vehicle steering system.

It is also an object of the present invention to provide a steering system capable of simultaneously and accurately effecting simultaneous steering motion of the wheels associated with a plurality of axles in a pultiple axle vehicle while permitting vertical oscillation of a single wheel without causing wheel steering geometry to be affected.

It is also an object to this invention to provide a steering system wherein hydraulic failure in one part of the system will not result in simultaneous failure of the steering systems in the other parts of the system.

It is a further object of the present invention to provide a vehicle steering system of the type described wherein the individually suspended wheels and their related steering arms are maintained in any desired steering attitude by a hydraulic lock.

It is also an object of the present invention to provide a vehicle steering system which may be used in any vehicle having three or more axles of which two or more are utilized to steer the vehicle.

It is a further object of the instant invention to provide a vehicle steering system utilizing push-pull control cables for actuation of the steering mechanisms of the rear axles in response to mechanical motion in the front axle, thereby creating accurate coordination and control of all wheels without the necessity of long hydraulic lines or pilot lines between the successive steering means.

It is a still further object of the present invention to provide a multiple axle vehicle steering system wherein all slack in the push-pull cables interconnecting the front steering arms and the steering machinery associated with the following steering arms is removed.

It is a further object of the invention to provide an anticipator cylinder for removal of all slack in the push-pull cables interconnecting the vehicle steering means.

Other objects of the invention will become apparent to those skilled in the art when the following specification is read in light of the accompanying drawings.

In the drawings:
FIG. 1 shows a plan view of the chassis and steering linkage for a ten-wheel vehicle embodying the present invention;
FIG. 2 shows a schematic diagram of the hydraulic steering system of the vehicle shown in FIG. 1; and
FIGS. 3 and 4 show sectional views of the anticipator cylinder and steering idler shaft assembly respectively.

Referring now to the drawings in greater detail, there is shown in FIG. 1 a vehicle chassis 10 having wheels 11, 12, 13, 14, and 15 mounted on opposite sides of the chassis so as to support it. All ten wheels are individually suspended and wheels 11, 12, 14, and 15 are steerable while wheels 13 are fixed and serve as drive wheels for the vehicle.

The forward dirigible wheels 11 are steered through a conventional steering gear and valve system 21. Movement of the vehicle steering wheel (not shown) shifts a valve spool in assembly 21 which directs oil to a steering ram 23 disposed between the vehicle frame and one end of a steering pivot arm 25. As the steering ram extends or retracts in response to the hydraulic fluid requirement of the vehicle as determined by assembly 21, the pivot arm 25 turns about its centrally located pivotal connection 27. Movement of the arm 25 about the pivot point 27 causes the wheels 11 to turn by means of long links 31 which are ball connected at either end to the pivot arm and the steering arms 33 attached to the wheel spindle.

Movement of the arm 25 is also transmitted through a relatively short link 35, which in turn transmits the motion through an idler shaft assembly 37 to a second short shaft 39 and pitman arm 41 to the gear and valve assembly 21. This motion, or more correctly, follow-up motion, centers the steering valve and causes a stoppage of the steering motion at the proper time.

FIG. 4 shows a cross sectional view of the idler shaft assembly 37 which is suitably attached to the frame 42 of vehicle chassis 10. As can be seen, the assembly comprises a shaft 43 carried by bearings 45 in a housing 47 which is fixed to frame 42. At one end of the shaft, a lever 49 is splined thereto for attaching link 49 to the assembly. A lever 51 is splined on the opposite end of the shaft for mounting one end of link 35. The lever 51 also serves as a connection point for push-pull control cables utilized to transmit mechanical motion from the front axle steering pivot arms to valve control means associated with the ram controlled steering mechanism of other steerable wheels.

As will be discussed in more detail later, each individual steering system in the vehicle is suitably restricted or blocked off from the others so that failure in one unit will still allow power steering to be accomplished in other units. If the power steering in any of the rear steerable units should fails, the wheels 11 would still be able to be steered with hydraulic power assist. On the other hand, if the hydraulic unit for the forward set of wheels 11 should in some way be put out of commission, the following steerable wheels would be operable with hydraulic power assist only if steering motion can be suitably transmitted to them from the steering wheels and steering gear and valve mechanism 21.

In large heavy vehicles, however, the operator is not able to manually steer the front wheels. When a self-centering spring link 55 is installed in follow-up link 35, if a power failure should occur in the mechanism for the forward wheels, manual operation of the steering wheel will still not effect a steering change in the forward wheels but the spring link will allow motion transmitted mechanically from steering gear assembly 21 to be passed to the rear steerable wheels so that steering control may be maintained in those wheels. In other words, if the forward system should fail for some reason, the steering motion in assembly 21 will pass through the follow-up linkage in a reverse direction since spring-link 55 will allow idler shaft 37 to rotate and thus transmit a force to lever 51 and the push-pull cables.

As shown in FIG. 1, a pair of push-pull cables 57 and 59 extend rearwardly from their connection with lever 51. A motion transmitted through these cables also passes through an anticipator cylinder 61 and a self-centering spring link 63 in each cable.

Referring now to the steering system for the second and fourth set of wheels of the vehicle, cable 57 is attached to a frame mounted bellcrank 65 to the other end of which is fastened a control valve 67. Although the cable 57 could be directly attached to valve 67, the arrangement using the bellcrank 65 causes the linkage to have greater sensitivity to motion of the front steering pivot arm. The spring link 63 accomplishes the dual function of preventing damage to the steering linkage if any one of the dirigible wheels experiences a high shock load due to encountering an obstruction and also prevents over-stressing of the cable as the front steering arm moves if the steering mechanism for the number two and four axles becomes inoperative due to hydraulic failures.

A frame cross member 69 is mounted between the non-dirigible wheels 13 and has mounted thereon, in turn, two steering pivot arms 71 and 73 in a back-to-back relationship and pivoted at points 75 and 77, respectively. These steering pivot arms are interconnected by a rigid link 79. A steering jack 81 is connected to arm 73 and is disposed so as to provide power for moving both steering arms about their pivot points such that they move in opposite directions; this imparts equal angular motion to wheels 12 and 14 in opposite directions. Steering arm 71 is connected to the wheels 12 through long links 83 while steering arm 73 is connected to the wheels 14 through long links 85.

When valve 67 is actuated by means of the bellcrank 65 and cable 57, hydraulic fluid actuates steering jack 81 which serves to rotate steering arm 73 in one direction and steering arm 71 in the opposite direction due to their rigid interconnection through link 79.

In the steering system for the fifth set of wheels, the cable 59 acting through an anticipator and spring link actuates a bellcrank 91 so as to operate a valve 93 to provide a hydraulic fluid to steering jack 95 which is attached to a steering arm 97 pivoted at point 99. Steering arm 97 is connected to wheels 15 through long links 101.

In the steering system for the second, fourth, and fifth axles, it should be noted that by installing the valves 67 and 93 between the bellcranks and the steering arms a follow-up means is incorporated into the systems. As the steering arms change in angular relationship to the frame, the valves will be closed when the proper steering attitude of the wheels is reached and no more hydraulic fluid will be transferred to jacks 81 and 95.

In the preferred embodiment, the link rods connecting the pivot arms to the related steering arms of the various wheels are reasonably long. Further, the pivot arms are of such a configuration that the link rods are angled slightly downward from the steering pivot arms to the steering arm associated with each wheel and the links become essentially parallel to the vehicle frame at the mid-point of the wheel oscillation limits. Thus, vertical oscillation of the various independently suspended dirigible wheels is permitted without seriously affecting the steering geometry of any other dirigible wheel, thereby preventing undesirable tire scuffing. If the links were shorter and the angle from the steering pivot arm to the steering arm were different, vertical oscillation would be likely to cause a significant change in geometry so as to force the wheel to turn and, additionally, other dirigible wheels might be affected.

When the push-pull cables 57 and 59 have play or slack in them or when such play exists in the pivots, valves, etc. of the steering linkage, there exists a likelihood that all of the dirigible wheels will not be turned to the proper degree, thus causing tire scrubbing and an apparent lack of coordination of steering motion. In this same regard, when vehicles utilizing this invention are mass produceed, the degree of looseness in the linkage between the steering mechanism will likely vary from one vehicle to another. It is for this reason that each of the steering cables has mounted therein an anticipator cylinder 61 which is illustrated in section in FIG. 3. The anticipator cylinder functions to take up slack in the linkage between the steering pivot arm and the steering valve regardless of which direction the vehicle is to be steered.

As shown in that figure, the anticipator cylinder 61 is comprised of a housing 103 having a spool 105 with a centrally located piston portion 107. In its non-operative position, the spool is maintained in a centrally located position, as shown, by means of a spring 109 which is held in place between a spring keeper 111 and a spacer 113. Slidable mounting of the spacer 113 on a reduced portion 115 of the spool allows the spring to bias the spacer against a surface 117 in the housing thereby forcing the spool to the centrally disposed position shown in FIG. 3 due to the abutment of the spacer with the shoulder of the spool at the end of reduced portion 115.

Spring keeper 111 is a floating spring keeper which consists of a tube 119, a collar 121 fixed within the tube, and a spring restraining member 123 fastened to the outside of the tube. Land or piston portion 107 of the spool is centered within chamber portion 125 by the adjustment of a nut 127 on a threaded section of reduced portion 115 of the spool.

In operation, cylinder head pressure in steering jack 23 is also transmitted to port 129 in the anticipator and rod chamber pressure of the jack 23 is transmitted to port 131. The pressure applied to either of these ports will cause spool 105 to move in a direction that is proper for either direction of vehicle steering. Shims 133 are installed in the chamber 125 so as to limit the travel of the spool 105 to an amount that is proper to start valve 67 or 93 toward the open position. Further motion, however slight, of the front steering pivot arm 25 will result in further opening of the valve, thereby preventing the steering motion of the rear axles from lagging that of the forward axle. It is important to note that an anticipator is installed in each of the cables so that all dirigible wheels are coordinated. A threaded extension 135 of the spool 105 and a threaded bore 137 of the housing 103 are illustrated to show how cables, such as Controlex cables, may be attached to the anticipator.

In summary when hydraulic pressure is transmitted to port 129, 105 will telescope into the housing 103 causing a pressure to be exerted on the cable so as to transmit a signal to the respectively controlled steering follow-up valve This allows the vehicle to make a completely coordinated turn to the left. On the other hand, pressure to port 131 will cause spool 105 to extend further out of housing 103 so as to transmit a signal to the steering follow-up valve for a right turn of the vehicle. Note that in a right turn wheels 11 and 12 will steer to the right and wheels 14 and 15 will steer to the left.

Referring now to the hydraulic circuit of FIG. 2, a reservoir 201 supplies fluid to an engine driven pump 203 which delivers the fluid under pressure to an accumulator charge valve 205 and a charge selector valve 207. The charge selector valve may be that shown in U.S. Patent 3,278,239 issued to Klaus, et al. and assigned to the assignee of this invention. The charge selector valve delivers the fluid to accumulator circuits 209 and 211. An accumulator 213 is charged over circuit 209 and supplies pressure fluid to the hydro-mechanical valve assembly 21 controlling the steering jack 23 associated with the mechanism for steering wheels 11. One or more accumulators shown at 215 are charged over circuit 211 and supply pressurized fluid to steering valves 67 and 93. A plurality of accumulators may be used as shown at 215 since the jack for steering wheels 12 and 14 is larger and requires more volume than that for steering wheels 11 and since the accumulators must also service wheels 15. Obviously, if desired, a single larger capacity accumulator could be used at 215 instead of a plurality of accumulators.

Should there be a failure in the accumulator circuit 211, wheels 11 may still be hydraulically steered from the pressure provided by accumulator 213 to safely control the vehicle. On the other hand should failure occur in circuit 209, whether or not wheels 11 are still manually steerable, wheels 12, 14, and 15 will be steerable hydraulically due to the action of the spring takeup link 55 in the manner previously described.

Thus it has been shown how the invention produced by the applicants can be utilized in a five-axle vehicle. Extensions of the system to a vehicle with a greater number of axles will be obvious to those skilled in the art from the previous discussion.

If it should be desired to utilize the invention on a four-axle vehicle, wheels 15 and its controlling linkages, valve, jack, etc. may be eliminated entirely and the accumulators at 215 will serve only steering valve 67.

Should it be desired to use the invention in a three-axle vehicle, referring to FIG. 1 wheels 11 would be eliminated and steering follow-up link 39 would be directly attached to steering pivot arm 71 near the end thereof. The valve in steering assembly 21 would then control steering jack 81 to position the steering mechanisms for wheels 12 and 14. This of course eliminates the necessity for such items as the cable, valve 67, etc. Referring to FIG. 2, a three-axle vehicle would also not require charge selector valve 207. Thus, in the three-axle vehicle, fluid would be transferred from accumulator charge valve 205 directly to circuit 211 and the circuit would service only the valve in steering mechanism 21 which replaces valve 67.

In steering any vehicle utilizing the invention regardless of number of axles thereon, lines coincident with the wheel center and perpendicular to the direction of wheel travel for all dirigible wheels will intersect at a common point. In a three-axle vehicle, the right hand dirigible wheels will follow each other in a circular track and the left hand dirigible wheels will also follow each other in a circle which is concentric to the circle formed by the right hand wheels. In a four-axle vehicle, wheels 12 and 14 will follow circular paths as in the three-axle vehicle and each wheel 11 will prescribe a concentric circle of a larger diameter than the circle formed by the wheels 12 and 14 on the same side of the vehicle. A vehicle having five axles will have its wheels prescribed concentric circles as in the four-axle vehicle and wheels 15 will follow in the circles prescribed by wheels 11.

The above described condition of a common intersect point of the axis of all dirigible wheels allows smooth turning motion and minimizes tire scrubbing. It is accomplished by the design of the vehicle, in the spacing between wheels on each side of the vehicle, and in the configuration of the steering linkage and steering arms on the individual wheels.

As is evident from the preceding, a multi-axle vehicle steering means has thus been provided which allows completely coordinated steering of the dirigible wheels of the vehicle while reducing tire scrubbing to a minimum.

What is claimed is:

1. In a vehicle having a plurality of sets of dirigible wheels, a linkage interconnecting the oppositely disposed wheels in each set of dirigible wheels, turn coordination linkage in said vehicle connecting the forward set of dirigible wheels with all subsequent sets of dirigible wheels, means in said interconnecting linkage allowing each dirigible wheel to move vertically individually without changing the direction of steer of any other dirigible wheel, means in said turn coordination linkage taking up all slack therein in response to the commencement of a turn of said forward set of dirigible wheels, hydraulic actuating means connected to said dirigible wheels for turning thereof, and means for transmitting an hydraulic actuating signal to said slack take-up means from said hydraulic actuating means.

2. In a vehicle having a plurality of sets of dirigible wheels, a linkage interconnecting the oppositely disposed wheels in each set of dirigible wheels, turn coordination linkage in said vehicle connecting the forward set of dirigible wheels with all subsequent sets of dirigible wheels, means in said interconnecting linkage allowing each dirigible wheel to move vertically individually without changing the direction of steer of any other dirigible wheel, means in said turn coordination linkage taking up all slack therein in response to the commencement of a turn of said forward set of dirigible wheels, hydraulic actuating means connected to each set of dirigible wheels, and means for transmitting an hydraulic actuating signal to said slack take-up means from the hydraulic actuating means associated with said forward set of dirigible wheels.

3. In a vehicle, means for steering said vehicle, a primary set of dirigible wheels on said vehicle, primary wheel power means connected to said primary set of dirigible wheels for turning them, an element in said steering means operable to transmit an actuation signal to said primary wheel power means, at least one secondary set of dirigible wheels on said vehicle, secondary wheel power means connected to said at least one secondary set of dirigible wheels for turning them, means associated with said secondary wheel power means to actuate said secondary wheel power means, means connecting the steering means element with the actuating means of said secondary wheel power means, and anticipator means in said connecting means receiving a signal from said primary wheel power means and exerting additional pressure on said connecting means in proportion to that signal, thereby removing all slack in said connecting means and thus insuring equal and simultaneous steering of the primary and secondary dirigible wheels.

4. In a vehicle having a plurality of sets of dirigible wheels, means for turning all of said plurality of sets of dirigible wheels in exact unison comprising a pair of pivot arms movably fastened together and to a frame of said vehicle, a link means extending from said pivot arms to each wheel of said plurality of sets of dirigible wheels, power means operable to pivot said pivot arms thereby turning said dirigible wheels, a primary set of dirigible wheels on said vehicle not actuated by said pivot arms, and means interconnecting said primary set of dirigible wheels and said plurality of sets of dirigible wheels for turning said plurality of sets of dirigible wheels simultaneously with a turn of said primary set of dirigible wheels.

5. The vehicle of claim 4 wherein said interconnecting means includes a slack take-up means.

6. The vehicle of claim 5 wherein said slack take-up means includes an anticipator means operable to transmit a signal to said power means in response to a turn signal being transmitted to said primary set of dirigible wheels.

7. In a steering system for a vehicle having a plurality of sets of dirigible wheels, each actuated by hydraulic means controlled by valve means, means connecting each set of dirigible wheels for coordinated steering including an anticipator housing having a double-acting piston therein, one of said valves attached to said anticipator housing and the other of said valves attached to said double-acting piston, means in said anticipator housing for moving said double-acting piston in a direction dependent upon the direction of motion of one of said hydraulic means whereby the valve controlling the other of said hydraulic means is actuated in a direction suitable for such coordinated steering.

8. The system of claim 7 wherein said connecting means also connects said one hydraulic means with the valve controlling said other hydraulic means whereby that valve is further actuated by the operation of said one hydraulic means.

9. The system of claim 8 wherein said connecting means further comprises a flexible means whereby, upon failure of the said one hydraulic means, a steering signal will still be delivered to said other hydraulic means.

10. An hydraulic vehicle steering system comprising a pressurized fluid supply in an accumulator charging system which distributes fluid to a plurality of accumulators, each accumulator servicing at least one steering jack, said fluid distributed to said accumulators through a charge selector valve, thereby segregating said accumulators and their respective steering jacks from one another, means operatively connecting said steering jacks to each other for simultaneous steering thereof, an anticipator means operatively connected to said connecting means for removing all slack therefrom, and means for transmitting an actuating signal to said anticipator in response to a steering demand signal being delivered to one of said steering jacks.

11. The system of claim 10 including means associated with said connecting means for transmitting an actuation signal to the other of said steering jacks in response to said steering demand signal, whether or not the hydraulic circuitry controlling said one of said steering jacks is pressurized.

References Cited

UNITED STATES PATENTS

| | | | |
|---|---|---|---|
| 1,306,227 | 6/1919 | Kane | 180—45 |
| 2,598,863 | 6/1952 | Tucker | 180—50 |
| 2,783,849 | 3/1957 | Armington et al. | 180—79.2 |
| 2,916,099 | 12/1959 | Bergmann et al. | 180—79.2 |
| 3,092,201 | 6/1963 | Biek | 180—79.2 |
| 3,292,725 | 12/1966 | Hlinsky | 180—79.2 |
| 3,185,245 | 5/1965 | Hoyt | 180—79.2 |
| 3,387,684 | 6/1968 | Becker et al. | 180—79.2 |

LEO FRIAGLIA, Primary Examiner

JOHN A. PEKAR, Assistant Examiner

U.S. Cl. X.R.

60—52